United States Patent

Cassady

[15] 3,638,965

[45] Feb. 1, 1972

[54] VEHICLE OUTRIGGERS

[72] Inventor: Samuel G. Cassady, Decatur, Ga.

[73] Assignees: Roy A. Martin; W. R. Martin, Atlanta, Ga.

[22] Filed: Jan. 19, 1970

[21] Appl. No.: 3,647

[52] U.S. Cl. .......................................................280/150.5
[51] Int. Cl. .............................................................B60s 9/02
[58] Field of Search...................280/150.5, 150 C; 212/145; 248/351, 352

[56] References Cited

UNITED STATES PATENTS 3,365,214   1/1968   Garnett...............................280/150.5
3,175,698   3/1965   Dassler..................................212/145

Primary Examiner—Leo Friaglia
Assistant Examiner—Robert R. Song
Attorney—Jones & Thomas

[57] ABSTRACT

An outrigger mechanism for a truck or similar vehicle which includes a generally rectangular framework connectable to a vehicle and having generally vertical side portions and a generally horizontal top portion. Support legs are pivotally connected at their inner ends to the lower portion of each side of the framework and are moveable between upwardly extending stored positions and outwardly extending ground engaging positions on opposite sides of the vehicle. A locking link is pivotally connected to each support leg and is moveable between a position resting upon the upper horizontal surface of the framework when its support leg is in its upper stored position and a wedging position against the vertical side portion of the framework when its support leg is in its outwardly extending ground engaging position to lock the support leg in this position.

8 Claims, 4 Drawing Figures

PATENTED FEB 1 1972

INVENTOR
SAMUEL G. CASSADY

BY
Jones & Thomas
ATTORNEYS

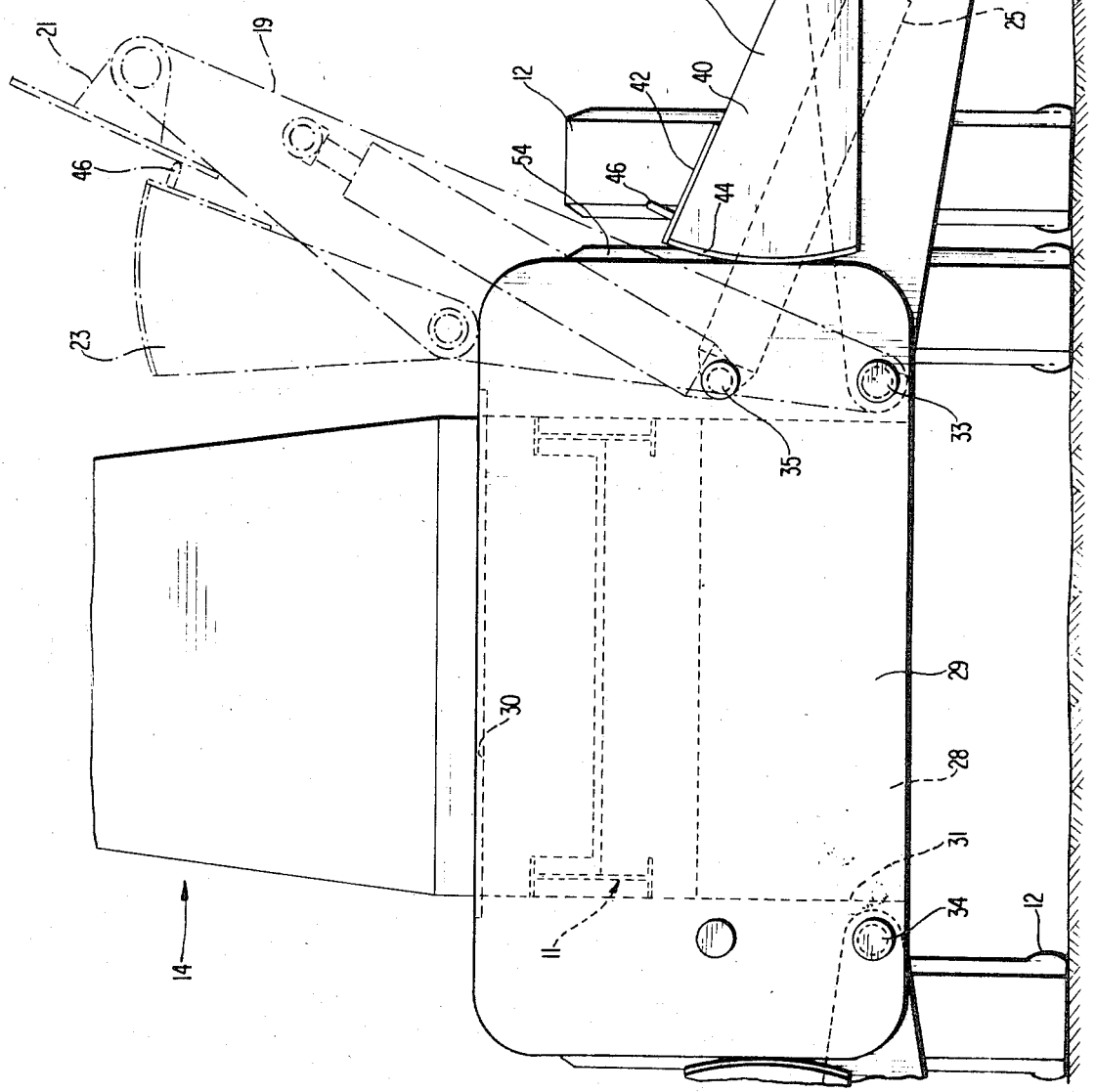

VEHICLE OUTRIGGERS

BACKGROUND OF THE INVENTION

Outriggers have been used to stabilize trucks and similar vehicles when there is a possibility of the truck tilting or overturning. The typical outrigger assembly usually comprises a pair of legs extendible out to the sides of the truck and into ground surface engagement by means of a hydraulic ram or by a mechanical device. The legs are usually locked into their ground engaging position by a mechanical latch structure or by locking the hydraulic rams.

The latch mechanisms utilized in the past with outrigger support legs have not successfully locked the support legs into their proper ground engaging positions when a truck rested on uneven ground surface since the latches were not capable of infinite adjustment and the angles at which the support legs extended from the truck varied in accordance with the uneven ground surface. Moreover, the mechanical latches previously utilized have permitted some undesirable play or looseness between the support leg and the truck.

While the hydraulic rams used to manipulate the outrigger support legs can be locked in virtually any position so that the support legs can be urged into and locked in contact with uneven ground surfaces, the loads carried by the truck may shift or surge so as to place an unexpectedly high load on one of the outrigger support legs and its locked ram which may damage or rupture the ram and cause the truck to tilt or overturn. Moreover, when the rams are to be utilized to lock the outrigger support legs in their down positions, the rams must be constructed with a capacity to bear the load of the support legs, which capacity is usually significantly higher than the capacity required to merely manipulate the support legs between their support positions and stored positions.

SUMMARY OF THE INVENTION

Briefly described the present invention comprises an outrigger assembly for a truck or similar vehicle which includes a latching mechanism for positively locking the outrigger support legs in virtually any ground engaging position. The construction of the locking links is such that the outrigger support legs can be locked in virtually any attitude with respect to the truck, as when the truck is resting on an uneven ground surface or when the truck is resting in the road bed and the outrigger support leg is resting upon a higher sidewalk surface, or vice versa. The locking links are pivotally connected to the support legs and are arranged to fall into their locking positions as the support legs are moved down toward their ground engaging positions.

Thus, it is an object of this invention to provide an outrigger assembly for a vehicle that positively locks its ground engaging support legs in their ground engaging positions when the surface upon which the support legs is level with, higher than, or lower than the surface upon which the vehicle rests.

Another object of this invention is to provide an outrigger assembly for a truck or similar vehicle that functions to firmly lock its support legs in their respective ground engaging positions without having to lock the hydraulic rams used to manipulate the legs.

Another object of this invention is to provide an outrigger assembly for connection to a truck or similar vehicle that is economical to manufacture, easy to connect to a truck or similar vehicle, which is convenient to operate and which is virtually maintenance free.

Other objects, features and advantages of the present invention will become apparent upon reading the following specification when taken into conjunction with the accompanying drawing.

BRIEF DESCRIPTION OF THE DRAWING

FIG. 3 is a rear view of the support frame and one support leg and its locking link, with the support leg shown in the ground engaging position by the full lines and moving towards its upwardly extending stored position by the broken lines.

FIG. 4 is a side view of a locking link.

DESCRIPTION OF THE PREFERRED EMBODIMENTS

Figure 1:
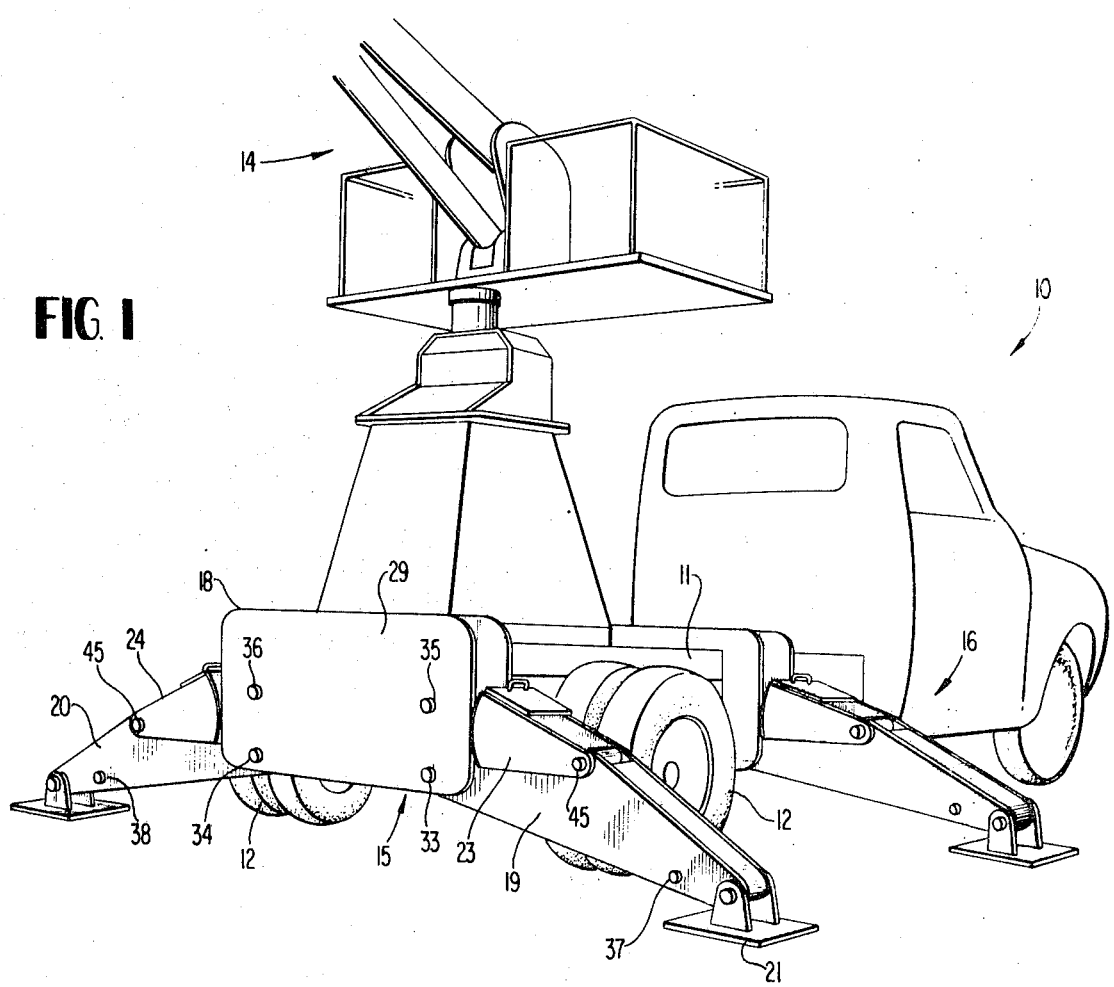
FIG. 1 is a rear perspective view of a pair of outrigger assemblies connected to a truck.

Referring now in more detail to the drawing, in which like numerals indicate like parts through the several views, FIG. 1 shows truck 10 which has a chassis 11 and rear wheels 12. A crane boom assembly 14 is supported by chassis 11 and arranged to reach out to the sides and rear of the truck to load and unload various articles. The crane can be of virtually any size or shape to reach a substantial distance from the truck, and does not comprise a part of this invention.

In order to stabilize the truck and eliminate the hazard of the truck turning over or tilting about its longitudinal centerline under the load of the crane boom 14, a pair of outriggers or stabilizer assemblies 15 and 16 are connected to the chassis of the truck. Rear stabilizer assembly 15 is connected to the rear end of the chassis while forward stabilizer assembly 16 is connected to the chassis at a position behind the cab of the truck. The stabilizer assemblies are generally similar to each other in construction and function, except as hereinafter set forth.

Figure 2:
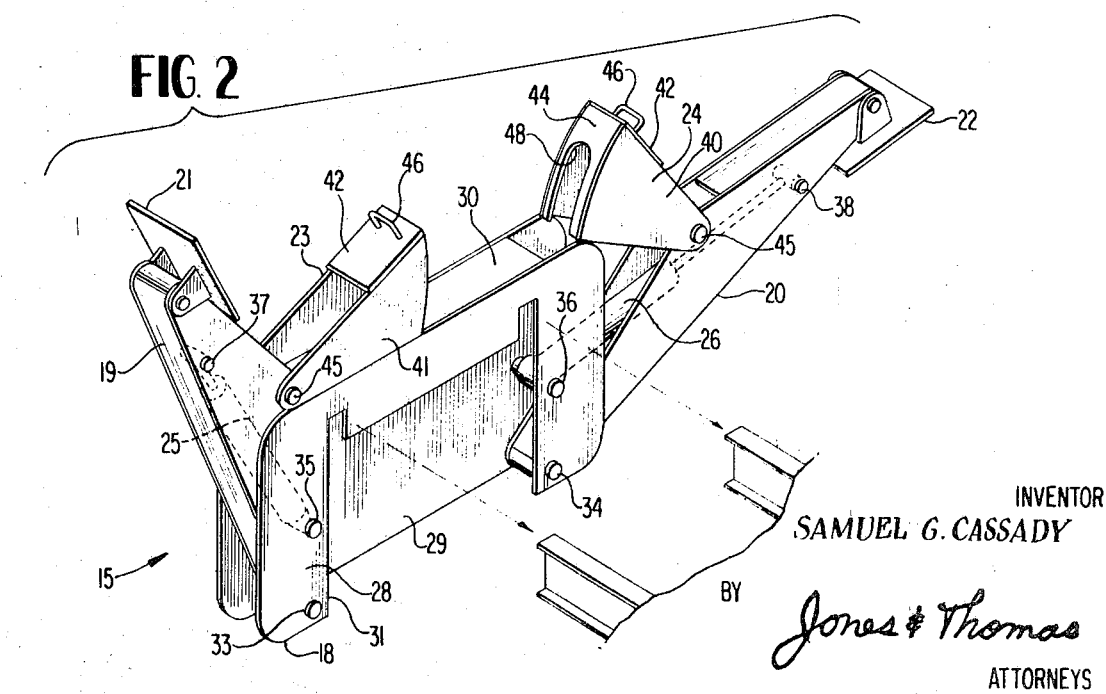
FIG. 2 is a perspective view of the front portion of a rear outrigger assembly, showing one support leg in its upwardly extending stored position and the other of its legs in a position halfway between its stored position and its supporting position.

As is best shown in FIG. 2 rear stabilizer assembly 15 comprises a framework or support 18, ground engaging support legs 19 and 20, feet 21 and 22, locking links or wedge blocks 23 and 24, and hydraulic rams 25 and 26. Framework 18 comprises a pair of spaced apart parallel plates 28 and 29 that are connected together by top plate 30 and internal ribs (not shown). Backplate 29 is generally rectangular, while front plate 28 conforms in size and shape to backplate 29 and defines cutout 31 that allows backplate 28 to be inserted downwardly over the chassis 11 of truck 10. Framework 18 is connected to chassis 11 by welding, clamping or any conventional means.

Support legs 19 and 20 are pivotally connected at their inner ends to the lower sides of framework 18 by hinge pins 33 and 34, and are moveable from upwardly extending stored or travel positions, as illustrated by support leg 19 in FIG. 2, to downwardly and outwardly extending ground surface engaging positions as illustrated in FIG. 1. Feet 21 and 22 are pivotal about the outer ends of support legs 19 and 20 so that they can be turned inwardly for storage and can be pivoted outwardly and in a downward direction to engage and conform to the possibly irregular ground surface when legs 19 and 20 are lowered. Hydraulic rams 25 and 26 are connected at their inner ends to pivot pins 35 and 36 in framework 18 and at their outer ends to pins 37 and 38 in support legs 19 and 20. Framework 18 and support legs 19 and 20 cover and protect rams 25 and 26. Pivot pins 35 and 36 are located above pivot pins 33 and 34, respectively, so that when hydraulic rams 25 and 26 are expanded or contracted, legs 19 and 20 will pivot about their respective pivot pins 33 and 34.

As is best shown in FIGS. 2 and 4, each locking link 23 and 24 comprises sideplates 40 and 41, top plate 42 and cam face 44. Sideplates 40 and 41 are spaced apart a distance sufficient to span the sides of support legs 19 and 20, and pivot pins 45 extend through aligned openings in sideplates 41 and 42 and support legs 19 and 20 to pivotally connect locking links 24 at their smaller outer ends to support legs 19 and 20 at a position intermediate the ends of the support legs. A handle 46 is connected to top plate 42.

Cam face 44 defines a cutout 48 that extends from its bottom edge up toward its top edge. Cutout 48 is of a width to span support legs 19 and 20 and allow its cam face to project down beside support legs 19 and 20 as illustrated in FIG. 3. Cam face 44 is curved to correspond with the curvature of the inner edges 49 of sideplates 40 and 41. As is best illustrated in FIG. 4, the curvature of the inner edges 49 of the sideplates has a radius of curvature 50 about a horizontal axis 51 which is positioned above the center of its hinge pin opening 52. This causes the distance between cam face 44 and hinge pin opening 52 to increase from the bottom edge toward the top edge of the cam face.

As is shown in FIG. 3, the side edges 54 of support plates 28 and 29 are approximately vertical and the top plate 30 is approximately horizontal. It should be noted that when the support legs are in their ground engaging positions pivot pins 45 of locking links 23 and 24 are normally located at a higher elevation than pivot pins 33 and 34 to which support legs 19 and 20 are connected. Thus, if one of the support legs 19 or 20 is moved so that its foot 22 is placed in a sink or hole in the ground surface at a level below that of wheels 12 of the truck, pivot pin 45 of the locking link will remain at a higher level than the pivot pin 33 or 34 for a substantial arc of movement of support leg 19 or 20. Thus, the horizontal distance between pivot pins 33 and 34 and their respective pivot pins 45 of their locking links will increase as support legs 19 and 20 are moved in a downward direction, until the pivot pins 45 reach a level equal to that of pivot pins 33 and 34. The structure is shaped so that when pivot pins 45 reach this lower level, the feet 21 and 22 of support legs 19 and 20 will be located at a position well below the ground surface beneath the truck. The particular outrigger assembly illustrated has been constructed to reach to a level 2 feet below the level upon which the truck rests before pivot pins 45 of locking links 23 and 24 reach the same level as pivot pins 33 and 34 of support legs 19 and 20. This reach distance for the support legs has been found to be sufficient for the majority of circumstances encountered.

The arcuate shape of cam face 44 of each locking link 23 and 24 is shaped so that as one of the support legs 19 or 20 is moved in a downward direction and the distance between its pivot pin 45 and one of the pivot pins 33 and 34 increases, the locking link will continue to engage the side edges 54 of framework 18. FIG. 3 illustrates that when the distance between a side edge 54 and a pivot pin 45 increases, the locking link will drop under the influence of gravity; however, the point of contact on the surface of cam face 44 will merely move up the cam face since the distance between pivot pin 45 and cam face 44 increases from the bottom edge toward the top edge of the cam face. Thus, the curvature of cam faces 44 of the locking links is such that the locking links are effective to wedge against the side edges 54 of framework 18 through a large arc of movement of support legs 19 and 20.

The longest distance between a pivot pin 45 and the surface of its cam face 44 is slightly shorter than the longest horizontal distance between pivot pins 33 or 34 and their respective pivot pins 45 when pivot pins 45 are at a level even with pivot pins 33 and 34. This causes locking links 23 and 24 to be withdrawn from frictional contact with side edges 54 of framework 18 when pivot pins 45 are at this elevation. Moreover, since the cam faces 44 are withdrawn in this position, support legs 19 and 20 will be allowed to move further in a downward direction even though the horizontal distances between pivot pins 45 and their respective pivot pins 33 and 34 is decreasing as pivot pins 45 move below the level of pivot pins 33 and 34. This enables support legs 19 and 20 of the outrigger to reach to an extremely low position, a position not normally encountered by the support legs, without having their locking links wedge against the side of framework 18 and hydraulic rams 25 and 26 can be locked to lock support legs 19 and 20.

When support legs 19 and 20 are moved from their upwardly extending stored positions toward their downwardly and outwardly extending ground surface engaging positions, locking links 23 and 24 will merely slide along the top surface of framework 18 until the support legs 19 and 20 are at a level which permits the locking links to drop down the side edges 54 of the framework. As soon as the locking links drop in this manner, support legs 19 and 20 will be wedged by the locking links so that they cannot be moved in an upward direction. As previously described, as the support legs 19 and 20 are moved further in a downward direction, locking links 23 and 24 will continue to drop and the point of contact of the cam faces against the side edges of framework 18 and will move in a downward direction while the point of contact on cam faces 44 will move up from the bottom edges of the cam faces toward the top edges thereof to accommodate the increasing horizontal distance between pivot pins 33 and 34 and their respective pivot pins 45.

When support legs 19 and 20 are to be repositioned from their ground engaging position to their upwardly extending storage or travel positions, locking links 23 and 24 are pivoted about their pivot pins 45 until they lay out toward the outer ends of the support legs. In order to disengage the locking links from the side edges 54 of framework 18, hydraulic rams 25 and 26 can be actuated to relieve the compression between the locking links and the framework and the handles 46 of the locking links are grasped and lifted which pivots the locking links about their pivot pins 45. When the locking links have been pivoted to extend in an outward direction, the hydraulic rams are actuated to lift the support legs. As the support legs approach their upwardly extending storage positions, the center of gravity of their locking links will tend to tumble the locking links onto the top surface of the framework. Also, when the upward pivotal movement of the support legs stop, the inertia of the locking links will tend to continue their movement so that they fall onto the top surface of framework 18.

It should be noted that the pivot pins 45 are located at positions on support legs 19 and 20 so that they pass around the curved intersection of the side edges 54 and the top of framework 18 at a distance sufficient to allow the passage of the outer ends of the locking links. This arrangement allows the support legs to move toward a substantially upright attitude so that the width of the outrigger when in its traveling position is relatively small, yet the length of the support legs is such that they can reach a substantial distance out to the side of the assembly.

As is best shown in FIG. 2, the rear support plate 29 of framework 28 of rear stabilizer assembly 15 is generally rectangular while forward support plate 28 defines a cut out to accommodate vehicle chassis. By contrast, both the forward and rear support plates of the front stabilizer assembly 16 define the cutouts so that the assembly can be slipped down onto the vehicle chassis. This difference in support plate structure is the only significant difference between forward stabilizer assembly 16 and rear stabilizer assembly 15.

While this invention has been described in detail with particular reference to preferred embodiments thereof, it will be understood that variations and modifications can be effected within the spirit and scope of the invention as described hereinbefore and as defined in the appended claims.

I claim:

1. An outrigger for stabilizing a vehicle or the like comprising a support member including a generally upright surface adapted to be rigidly connected to a vehicle, at least one leg member pivotally connected at one of its ends to said support member and including ground engaging means at its other end, said leg member being movable between a lower ground engaging position and an upper travel position, and a locking link pivotally connected at a first one of its ends to said leg member intermediate its ends and including an arcuate surface provided at its free end for wedging against said upright surface when said leg member is urged from its lower ground engaging positions toward its upper travel position.

2. The invention of claim 1 and wherein said locking link is connected to said leg member at a position along the length of said leg member so that said locking link is movable with said leg member from a position resting on the upper portion of said support member when said leg member is in its upper travel position to a position abutting a side portion of said support member when said leg member is in its lower ground engaging position.

3. The invention of claim 1 and wherein said locking link comprises an arcuate wedge surface of a radius of curvature about an axis displaced above its pivotal connection to said leg member when said leg member extends in a lateral direction, said radius of curvature being approximately equal to the distance from the middle portion of said wedge surface to said pivotal connection to said leg member.

4. An outrigger for stabilizing a vehicle or the like comprising a support having a top and side portion, a pair of support legs each pivotally connected about a generally horizontal axis at its inner end to a side portion of said support and having ground engaging means at its outer end, said support legs being moveable between upwardly extending travel positions and laterally extending ground surface engaging positions, a locking link pivotally connected at one of its ends about a generally horizontal axis to each support leg intermediate its ends, each of said locking links being moveable with their respective support legs under the influence of gravity from a position resting on the top portion of said support when its support leg is in its upwardly extending travel position to a wedging position against a side portion of said support when its support leg is in its laterally extending ground surface engaging position.

5. The invention of claim 4 and wherein each of said locking links comprises a convex wedging surface for engaging the side portion of said support, said wedging surface of each locking link having a radius of curvature about an axis displaced above and generally parallel to the horizontal axis of said locking link when said locking link is wedged against a side portion of said support.

6. The invention of claim 4 and wherein the pivotal connections of said support legs to said support are normally lower than the pivotal connections of said locking links to said support legs when said support legs are in their laterally extending ground engaging positions.

7. The invention of claim 4 and further including a hydraulic ram member connected to each of said support legs and said support, each of said hydraulic rams being pivotally connected to said support at a position above the connection of the support legs to said support.

8. In combination with a truck or the like having a wheel supported chassis, a pair of outriggers for stabilizing said chassis, said outriggers being spaced apart from each other along the centerline of said truck and each comprising: a support connected to and extending across said chassis, and including generally upright side surfaces, a support leg pivotally connected at its inner end to each side of said support and moveable between upwardly extending travel positions to outwardly extending ground surface engaging positions, and a locking member pivotally connected to each of said support legs intermediate its ends and arranged to lock each support leg in its outwardly extending ground engaging position and said locking member comprising an arcuate surface at its free end arranged to wedge against one of said upright side surfaces when said support leg is urged from its ground engaging position toward its upper travel position.

* * * * *